June 28, 1927.
E. F. OHLENDORF
BUMPER MECHANISM
Filed Sept. 10, 1926
1,633,901
2 Sheets-Sheet 1
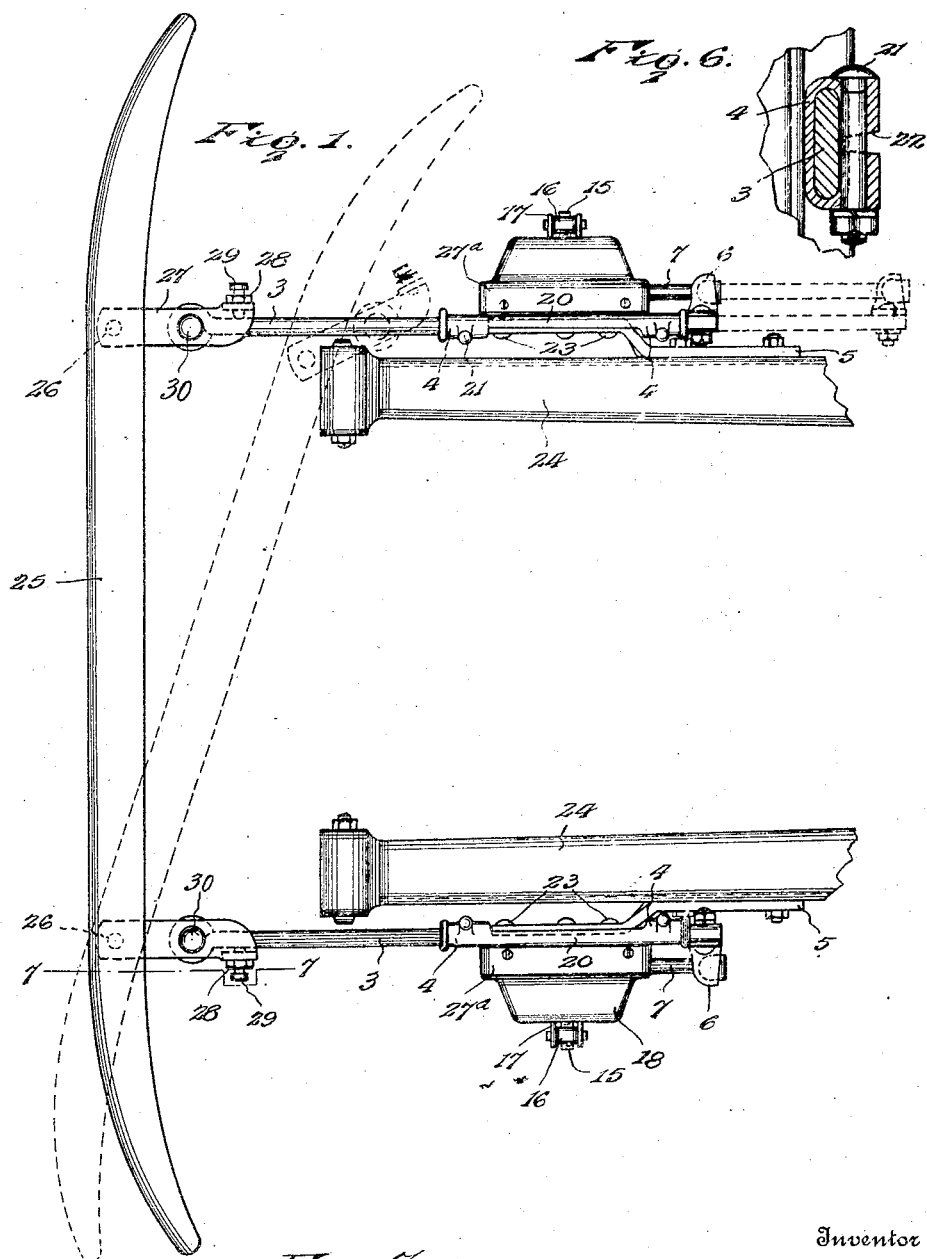
Inventor
E. F. Ohlendorf.
By Lacey & Lacey, Attorneys June 28, 1927.
E. F. OHLENDORF
1,633,901
BUMPER MECHANISM
Filed Sept. 10, 1926
2 Sheets-Sheet 2
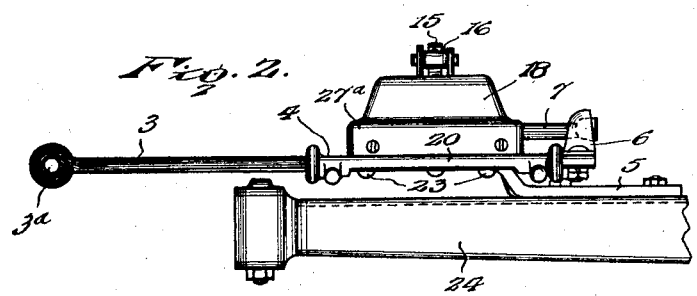
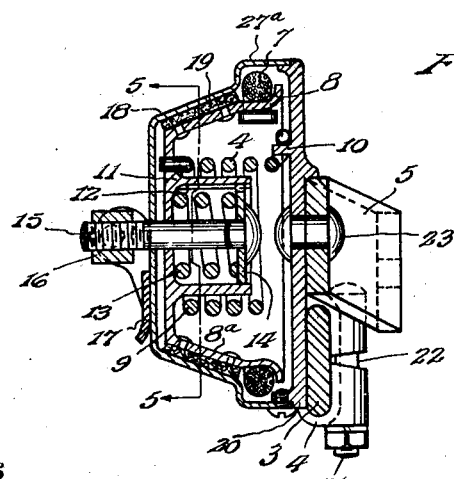
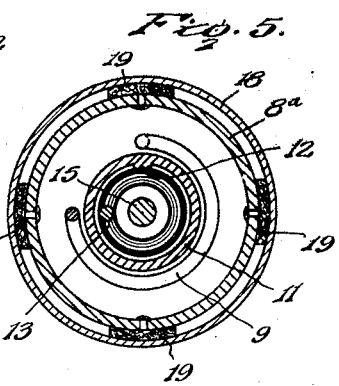
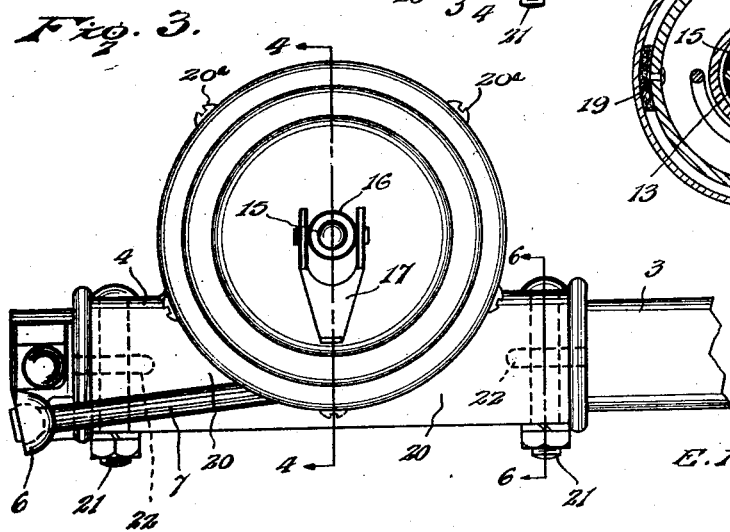
Inventor
E. F. Ohlendorf.
By Lacey & Lacey, Attorneys Patented June 28, 1927.

1,633,901

UNITED STATES PATENT OFFICE.

EMIL F. OHLENDORF, OF MOLINE, ILLINOIS.

BUMPER MECHANISM.

Application filed September 10, 1926. Serial No. 134,701.

The primary intent of the invention is to combine a brake mechanism with a bumper, so that the impact resulting from an object striking the bumper is compensated.

The invention further contemplates means for varying the resistance offered by the brake mechanism to the movement of the bumper, so that the bumper mechanism may be adjusted to yield under impacts of varying force.

The invention also provides a quick release for the brake mechanism, whereby the bumper may be restored to normal position and the brake and connections automatically returned to the initial position.

The invention moreover aims to mount the bumper so that when struck at one end the end sustaining the impact will move under the force of the blow without a like movement of the opposite end and without causing any binding of the parts.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a top plan view of a bumper mechanism embodying the invention, the dotted lines illustrating the position of the bumper when yielding to the impact of a blow delivered upon an end thereof.

Figure 2 is a top plan view of a brake mechanism, as it appears when mounted, and disconnected from the bumper.

Figure 3 is a side view of the brake mechanism, showing the parts on a larger scale.

Figure 4 is a detail sectional view on the line 4—4 of Figure 3, looking in the direction of the arrows.

Figure 5 is a detail sectional view on the line 5—5 of Figure 4, looking in the direction of the arrows.

Figure 6 is a detail sectional view on the line 6—6 of Figure 3, looking in the direction of the arrows, and having parts broken away, and Figure 7 is a detail sectional view on the line 7—7 of Figure 1.

Corresponding and like parts are referred to in the following description and designated in the several views of the drawings by like reference characters.

The numeral 24 designates the side bars of the chassis of a motor vehicle, the same being illustrated to show supporting means for the bumper mechanism. The bumper 25 may be of any construction and, as shown is rigid and of channel formation. Portions are partly cut from the front portion of the bumper and are pressed rearwardly to provide a pair of ears 26 at each end of the bumper to which links 27 are pivotally connected. The links 27 are preferably of U-form and their rear closed ends receive adjusting screws 29 and clamp nuts 28, the inner ends of the screws 29 engaging the outer sides of bars 3 which are pivoted at their outer or forward ends to the links 27 intermediate the ends thereof. The construction is such as to admit of a rectilinear movement of the bars 3 and a pivotal movement of the bumper 25 so that the latter may yield at one end under the impact of a blow delivered thereon and assume the position shown by dotted lines in Figure 1.

A plate 20 is connected to each of the side bars 24 and comprises an intermediate circular portion and front and rear alined guide portions 4 in which the bars 3 are slidably mounted. The guide portions are of sleeve formation and are split along one side, as indicated at 22 and receive bolts 21, whereby provision is had for contracting the sleeve guides 4 to compensate for any wear between said guides and the bar 3. A bar or plate 5 is bolted or otherwise secured at one end to each of the side bars 24 and its opposite end portion is laterally offset and receives the plate 20 which is riveted, or otherwise secured thereto.

The brake mechanism is mounted upon the plate 20 and includes a drum $27^a$ attached to the circular portion of the plate and having a conical portion 18, which constitutes a brake member. The brake drum 8 includes a brake member $8^a$ to which a brake lining 19 is applied, and which frictionally engages the inner surface of the brake member 18. This brake lining 19 may be of any arrangement and secured to the outer surface of the brake member $8^a$ in any determinate way. A collar 11 projects inwardly from the closed end of the inner drum 8. A coil spring 9 surrounds the collar 11 and one end is connected to the drum 8 by passing through an opening formed in the closed end thereof. The other end of the spring 9 is connected to a lug 10 projected laterally from a side of the plate 20. A coil spring 13 within the collar 11, is confined between the closed end of the drum 8 and a plate 14. A bolt 15 passes through the plate 14 and closed ends of the drums 8 and 27ª, and its projecting threaded end receives a nut 16 to which a cam lever 17 is pivoted. The cam lever 17 is forked and the furcations are mounted upon trunnions projecting from opposite sides of the nut 16. By adjusting the nut 16 on the projecting threaded end of the bolt 15 the tension of the spring 13 may be regulated to hold the brake member 8ª in contact with the brake member 18 according to the required resistance to be offered to the turning of the brake drum 8. When the lever 17 is moved to lie against the outer end of the fixed brake drum 27ª the spring 13 exerts a pressure to hold the brake drum 8 in contact with the brake drum 27ª so as to offer the required resistance to the turning of the movable brake drum 8. When the free end of the cam lever 17 is thrown outward the tension upon the spring 13 is released so that the brake drum 8 may turn freely under the influence of the spring 9 which returns it to normal position.

A flexible element 7 such as a short length of wire cable, is attached at one end to the brake drum 8 and passes through a slot in a side of the brake drum 27ª and is connected to the rear end of the bar 3. A bracket 6 attached in any substantial way to the bar 3 receives the outer end of the flexible element 7 which may be connected thereto in any preferred way. When the bar 3 moves rearwardly the flexible element is unwound from the brake drum 8 and the latter is rotated against the resistance offered by the coacting brake members 8ª and 18. The forward end of the bar 3 is provided with an eye 3ª which receives the pivot fastening connected to the links 27. When the bumper 25 is moved rearwardly by the impact of the same striking an object it remains in such position until drawn forward by the application of manual force, it being necessary to first release the brake mechanism by operating the lever 17 in the manner herein stated.

The links 27 are pivotally connected intermediate their ends to the respective bars 3 by means of bolts 30, or analogous fastenings. The closed ends of the links 27 engage the outer sides of the bars 3, whereby to normally maintain the bumper 25 in the full line position indicated in Figure 1. The drum 27ª is connected to the circular portion of the plate 20 by means of screws 20ª, or analogous fastenings which are adapted to admit of removal of the drum should the same become necessary from any cause. The plate 14 is prevented from turning relatively to the collar 11 by means of a rib 12 which extends lengthwise of the inner wall of the collar and enters a notch in the edge of the plate 14.

In the event of the bumper 25 striking an object so as to equalize the impact throughout the length of the bumper it will move and remain parallel to its normal position. However, should the impact cause a rearward movement of one end of the bumper only, as indicated by the dotted lines in Figure 1, the bumper will turn upon the pivot connecting the opposite end with the link 27. The link 27 connecting the rearwardly moving end of the bumper with the adjacent bar 3 will assume the position substantially as indicated by the dotted lines in Figure 1. As either one or both of the bars 3 move rearwardly the flexible connection 7 is unwound from the drum 8 which is rotated. The brake lining 19 carried by the drum 8 engaging the member 18 of the fixed brake drum 27ª retards the movement of the bumper. The resistance thus offered to the movement of the bumper may be regulated by adjusting the tension of the spring 13 through the bolt 15 and the nut 16. Rotation of the brake drum 8 tensions the spring 4 which reacts upon operating the lever 17 to release the drum 8 to restore the parts to normal position.

Having thus described the invention, I claim:

1. In a bumper mechanism, the combination with the bumper and a bar projected therefrom, of guide means slidably supporting said bar, a brake mechanism comprising complemental brake members, the one fixed, the other movable and frictionally engaging the fixed member, and connecting means between the said bar and the movable brake member.

2. In a bumper mechanism, the combination with the bumper and a bar projected therefrom, of a guide slidably supporting said bar, a brake mechanism including complemental fixed and movable drums, a flexible connection between the said bar and the movable brake drum, and a spring connection between the two brake drums for returning the movable drum to normal position.

3. In a bumper mechanism, the combination with the bumper and a bar extended therefrom, of a guide slidably supporting said bar, complemental brake drums, the one fixed, the other movable, connecting means between the movable brake drum and the said bar, a spring normally pressing the movable brake drum into engagement with the fixed brake drum and manually operable means for releasing the tension of said spring to admit of free movement of the bumper.

4. In a bumper mechanism, the combination with the bumper and a bar extended therefrom, guide means slidably supporting said bar, complemental brake drums, the one fixed, the other movable, connecting means between the movable brake drum and the said bar, a spring normally pressing the movable brake drum into engagement with the fixed drum, a plate for tensioning said spring, a nut threaded upon the bolt for adjusting the latter to vary the tension of the spring and a cam lever pivoted to said nut and adapted to effect a quick release of the spring to admit of free movement of the bumper.

5. In a bumper mechanism, the combination with the bumper, and a bar extended therefrom, of guide means slidably supporting said bar, cooperating fixed and movable brake drums, a flexible element forming connecting means between the movable brake drum and said bar, a coil spring forming yieldable connecting means between the two brake drums, a brake turning spring normally tensioned to rotate the movable brake drum in relation to the fixed brake drum, a bolt for tensioning the brake setting spring, a nut threaded upon the bolt and a cam lever for effecting a quick release of the brake setting spring to admit of a free movement of the bumper and an automatic return of the movable brake drum to normal position.

6. In combination, a bumper, links pivoted to opposite end portions of the bumper, bars pivoted at one end to said links, guide means slidably supporting the bars, a brake mechanism associated with each of the bars, means for regulating the resistance of the brake mechanism, and manually operative means for effecting a quick release of the brake mechanism to admit of free movement of the bumper.

7. In combination, a bumper, slidably mounted bars, a brake mechanism associated with the bars to offer a resistance to their movement under movement of the bumper when sustaining the force of an impact, links pivotally connecting the bumper and bars and laterally adjustable means between the links and bars for effecting alinement thereof.

8. In combination with a bumper, slidably mounted bars, and a brake mechanism for offering a resistance to the movement of said bars, of links pivoted at one end to the bumper and intermediate their ends to the slidably mounted bars and adjustable means mounted upon the rear ends of the links and engaging the outer sides of the respective bars.

9. In a bumper mechanism, the combination with the bumper, and a bar connected therewith, of a guide means supporting said bar, and a rotary friction brake mechanism associated with said bar to offer a resistance to the movement thereof.

10. In a bumper mechanism, the combination with the bumper, and a bar projected therefrom, of a guide means supporting said bar, a rotary friction brake mechanism comprising complemental brake drums, the one fixed, the other movable, and connecting means between the said bar and the movable drum.

11. In a bumper mechanism, the combination with the bumper, and a bar extended therefrom, of a guide means supporting said bar, a rotary friction brake mechanism comprising a fixed member and a movable member, connecting means between the movable member and the said bar, a spring normally pressing the movable member into engagement with the fixed member, and manually operable means for releasing the tension of said spring to admit of free movement of the bumper.

In testimony whereof I affix my signature.

EMIL F. OHLENDORF. [L. S.]